US010354780B2

(12) United States Patent
Smith et al.

(10) Patent No.: US 10,354,780 B2
(45) Date of Patent: *Jul. 16, 2019

(54) GAS BLOCKING CABLE AND METHOD OF MANUFACTURING

(71) Applicant: TE Wire & Cable LLC, Saddle Brook, NJ (US)

(72) Inventors: Gregory J. Smith, Old Saybrook, CT (US); Robert M. Canny, Saddle Brook, NJ (US); Jacek Dutka, Union, NJ (US); Safi Khan, Wallingford, CT (US); Jose Mosquera, Wallingford, CT (US); Mark Peters, Midland Park, NJ (US)

(73) Assignee: TE Wire & Cable LLC, Saddle Brook, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,356

(22) Filed: Feb. 26, 2018

(65) Prior Publication Data

US 2018/0182512 A1    Jun. 28, 2018

Related U.S. Application Data

(63) Continuation-in-part of application No. 15/816,249, filed on Nov. 17, 2017, which is a continuation of
(Continued)

(51) Int. Cl.
*H01B 9/06* (2006.01)
*H01B 11/04* (2006.01)
(Continued)

(52) U.S. Cl.
CPC ........... *H01B 9/0677* (2013.01); *H01B 7/285* (2013.01); *H01B 13/22* (2013.01); *H01B 13/322* (2013.01); *Y02A 30/14* (2018.01); *Y10T 29/49201* (2015.01)

(58) Field of Classification Search
CPC ....... H01B 11/04; H01B 7/285; H01B 9/0677
(Continued)

(56) References Cited

U.S. PATENT DOCUMENTS 3,576,940 A   5/1971   Stone et al.
3,800,066 A   3/1974   Whitfill, Jr. et al.
(Continued)

FOREIGN PATENT DOCUMENTS

EP          0145307 A2    6/1985

OTHER PUBLICATIONS

Jan. 25, 2013—(EP) Extended ESR—App. No. 12188593.3.
Apr. 19, 2016—(EP) First Examination Report—App. No. 12188593.3.

*Primary Examiner* — Chau N Nguyen
(74) *Attorney, Agent, or Firm* — Banner & Witcoff, Ltd.

(57) ABSTRACT

A gas blocking cable includes cabled wires, where each wire includes cabled conductors having interstitial areas there between. An insulation material circumferentially surrounds the cabled conductors and a conductor filling material is positioned within the interstitial areas between conductors. A first shield circumferentially surrounds the twisted wires and a high-temperature filler, thereby separating a drain wire. A second shield circumferentially surrounds the cabled wires and the drain wire so that a cable is formed with areas between the first shield and the second shield. A wire filling material is positioned within the areas between the wires and the shields. Each of the conductor filling material and wire filling material is inert, non-flammable and able to withstand a temperature of at least approximately 200° C.

20 Claims, 5 Drawing Sheets

Related U.S. Application Data application No. 13/650,729, filed on Oct. 12, 2012, now Pat. No. 9,837,187.

(60) Provisional application No. 61/547,168, filed on Oct. 14, 2011.

(51) Int. Cl.
*H01B 7/285* (2006.01)
*H01B 13/22* (2006.01)
*H01B 13/32* (2006.01)

(58) Field of Classification Search
USPC .................................. 174/105 R, 113 R, 116
See application file for complete search history.

(56) References Cited

U.S. PATENT DOCUMENTS

| | | |
|---|---|---|
| 3,832,481 A | 8/1974 | Boyd et al. |
| 4,005,168 A | 1/1977 | Whitfill, Jr. et al. |
| 4,033,800 A | 7/1977 | Ollis |
| 4,317,002 A | 2/1982 | Spicer |
| 4,755,020 A | 7/1988 | Willis et al. |
| 4,767,182 A | 8/1988 | Parfree et al. |
| 5,010,209 A | 4/1991 | Marciano-Agostinelli et al. |
| 5,355,427 A | 10/1994 | Gareis et al. |
| 5,414,217 A | 5/1995 | Neuroth et al. |
| 5,457,285 A | 10/1995 | Faust et al. |
| 6,486,395 B1 * | 11/2002 | Temblador ............... H01B 9/02 174/102 R |
| 7,288,721 B2 | 10/2007 | Varkey et al. |
| 7,297,873 B2 | 11/2007 | Grogl et al. |
| 7,750,243 B1 | 7/2010 | Mumm et al. |
| 7,750,244 B1 | 7/2010 | Melding |
| 7,935,890 B2 | 5/2011 | Holzmueller et al. |
| 9,837,187 B2 * | 12/2017 | Nadakal ................ H01B 7/285 |
| 9,959,954 B1 * | 5/2018 | Jackson ............... H02G 3/0468 |
| 10,002,689 B2 * | 6/2018 | Straniero ................ H01B 9/02 |
| 2008/0302556 A1 | 12/2008 | Varkey et al. |
| 2010/0097023 A1 | 4/2010 | Nakamura et al. |
| 2010/0263904 A1 | 10/2010 | Varkey et al. |

* cited by examiner

GAS BLOCKING CABLE AND METHOD OF MANUFACTURING

CROSS-REFERENCE TO RELATED APPLICATION

This application is a continuation-in-part to U.S. Non-Provisional patent application Ser. No. 15/816,249 filed Nov. 17, 2017, which is a continuation to U.S. Pat. No. 9,837,187 which issued on Dec. 5, 2017 and was filed as U.S. Non-Provisional patent application Ser. No. 13/650,729 on Oct. 12, 2012, entitled GAS BLOCKING CABLE AND METHOD OF MANUFACTURING, which claims priority to U.S. Provisional Patent Application Ser. No. 61/547,168, filed Oct. 14, 2011, the disclosures of each of which are incorporated by reference in their entirety.

FIELD OF THE INVENTION

The present invention relates generally to multi-conductor cables and, more particularly, to a multi-conductor cable capable of blocking passage of high pressure gases and other fluids through the interstitial spaces of the cable and a method of making the cable.

BACKGROUND

Power generation turbines are typically housed in containment areas to protect individuals in the event of an explosion. Sensors from the turbines communicate with instrumentation and equipment in the turbine control room via multi-conductor sensor cables. In the event of an explosion in the turbine containment area, when conventional multi-conductor cables with no gas blocking capabilities are used, high pressure, hazardous gases will travel through the interstitial spaces of the cables and will reach control rooms and may cause harm to people operating the control room. Historically, gas blocking is achieved only in a cable gland assembly connection to the frame wall. Such an approach, however, leaves a leak path through the interstitial space in the cable. A need exists for a multi-conductor cable that eliminates interstitial leak paths.

The marine industry has been using water blocked cables for many years. Such cables, however, would fail to prevent the leakage of hazardous high pressure gases in the event of an explosion. Furthermore, such cables cannot withstand the high cable operating temperature environment of a power generation turbine application (up to 200° C.).

The IEC (International Electro-technical Commission) released Specification EN-60079-14 in 2008. This specification covers instrumentation cables that are used on power generation turbines. A need therefore exists for cables that meet the new stringent IEC requirements. Although fluid blocking technology is used in water block cables, as noted previously, the temperature rating and pressure requirements of the "explosion proof" cables necessary to meet the IEC requirements are far beyond the capability of the technology in water block cables.

Recent changes to UL 1277 Impact Test requirements require that the two outer braids of a gas blocking cable be removed during impact testing. To meet the new requirements, the following steps have been taken to lessen impact to the plurality of insulated conductors within the cable. There is a need for a cable that meets gas block requirements while meeting UL 1277 requirements.

DETAILED DESCRIPTION OF EMBODIMENTS

While the gas blocking cable of the invention is described below in terms of a power generation turbine application, it may be used for other applications by varying the chosen materials and configuration (number of conductors, wires, etc.). Due to the many variations of the multi-conductor cables used in these applications and the non-circular cross-section of these cables, a configuration that is not too deviant from existing cables is preferable. This enables the end user to use the cables of the invention without significant changes to the hardware and installation process. This introduces the challenge of filling the larger interstitial spacing between the conductors requiring filling compounds that can be cured after the processing and that will not affect the flexibility of the cables.

Gas fluid leakage can occur through a) the spaces between the strands of the conductors, b) the space between the individual wires made up of insulated stranded conductors, and c) the space between Aluminum/Mylar tape and outer Fluoro-polymer jacket. Thus, it is clear that these three paths need to be blocked to meet the requirements of a gas blocking cable.

Figure 1:
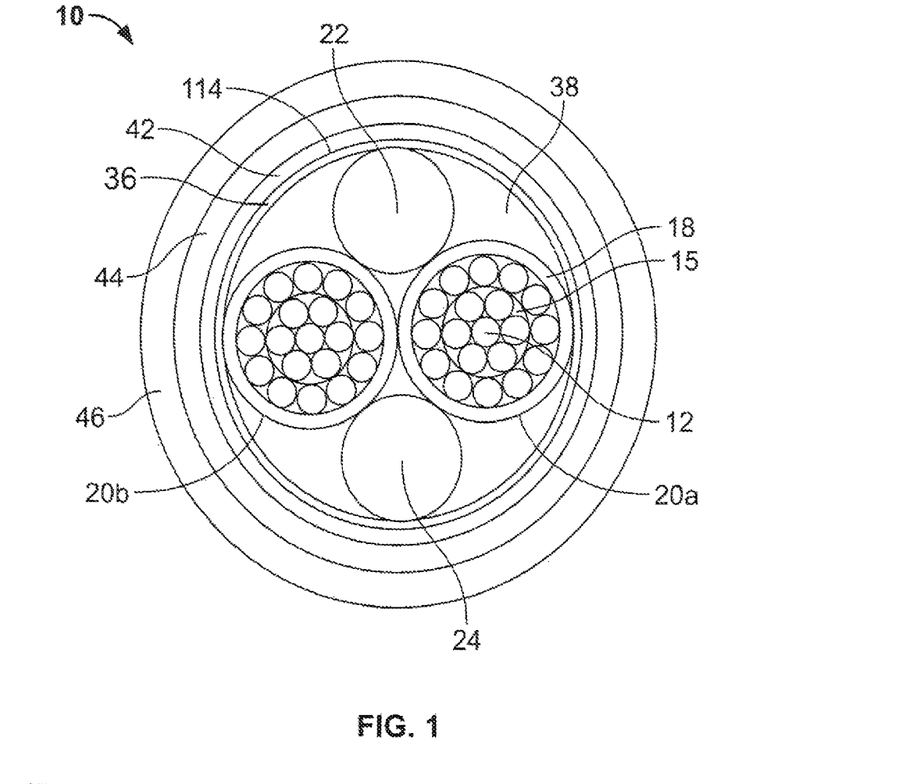
FIG. 1 is a cross sectional view of an embodiment of the gas blocking cable of the invention.

An embodiment of the gas blocking cable of the present invention is indicated in general at 10 in FIG. 1. The illustrated embodiment includes a number of insulated conductors 12. As an example only, the conductors may be 14 AWG, 19 strand, silver plated copper wire. The strand interstitial spaces or areas 15 are filled with a silicone compound. An insulation material 18 circumferentially surrounds the conductors. Insulation 18 may be, as an example only, helically wrapped polyimide tape with an overcoat of liquid polyimide that is heat cured.

The wires 20a and 20b, which are made up of the insulated conductors 12, are twisted with a drain wire 22 and a filler 24 to provide the cable with a round profile. The drain wire 22 is, as an example only, a 16 AWG tin plated copper wire. The high temperature filler 24 is preferably extruded silicone or FEP monofilament.

The twisted wires 20a and 20b, drain wire 22 and high temperature filler member 24 are wrapped with a shield 36 so that they are circumferentially surrounded. The shield 36 may be, as an example only, Aluminum/Mylar tape. The spaces or areas 38 between the twisted wires, drain wire and high temperature filler are filled with a silicone compound. A jacket 42 is extruded over the shield 36 and may be, as an example only, extruded FEP (Fluorinated Ethylene Propylene). As an example only, the nominal diameter of the jacket layer 42 may be 0.212 inches. A high temperature fiberglass braid 44 preferably covers the jacket 42 while a stainless steel braid 46 preferably covers the fiberglass braid 44. In some cable configurations, an additional extruded FEP jacket is applied over the stainless steel braid.

It is to be understood that the embodiment of the gas blocking cable of FIG. 1 is an example only, and that the cable of the invention could be constructed with many alternative materials and number of any of the conductors, wires, drain wires and/or fillers in many alternative configurations.

A variety of filling material compounds may be used to fill the interstitial and other spaces or areas in the cable in the manner described above. The filling material must be inert, non-flammable and able to withstand, and suitable for operation, temperatures up to at least approximately 200° C. A two-part, room temperature curable silicone compound preferably is used. While such a silicone compound is preferably used, other suitable compounds in the art may alternatively be used. Examples of suitable silicone compounds include, but are not limited to, the following:

a. One-part heat cure silicone, TSE-322 made by Momentive.
   b. CST-2127, two-part silicone. This is a room-temperature cure two-part silicone compound available from Cri-Sil Silicone Technologies LLC of Biddeford, Me.
   c. CST-2327, two-part silicone. This is a modified version of CST 2127 and is the preferred silicone compound for use, for example, in the embodiment of FIG. 1, and is also available from Cri-Sil Silicone Technologies LLC of Biddeford, Me.

In order to get the compound into the space between the different insulated conductors and wires, it has to be applied during the cabling process or in a separate process right before the Aluminum/Mylar tapes goes on the cable. Embodiments of application devices that may be used for this purpose are illustrated in FIGS. 2-6. The filling material may be applied before or after conductors and/or wires are twisted. Multiple application devices may be used in series as required to produce the cable based on the configuration and intended use of the cable.

The following examples assume that, with reference to FIG. 1, the wires 20a and 20b have been provided by a supplier with their interstitial spaces 15 filled with a silicon compound (such as those described above) or another suitable material.

Figure 2:
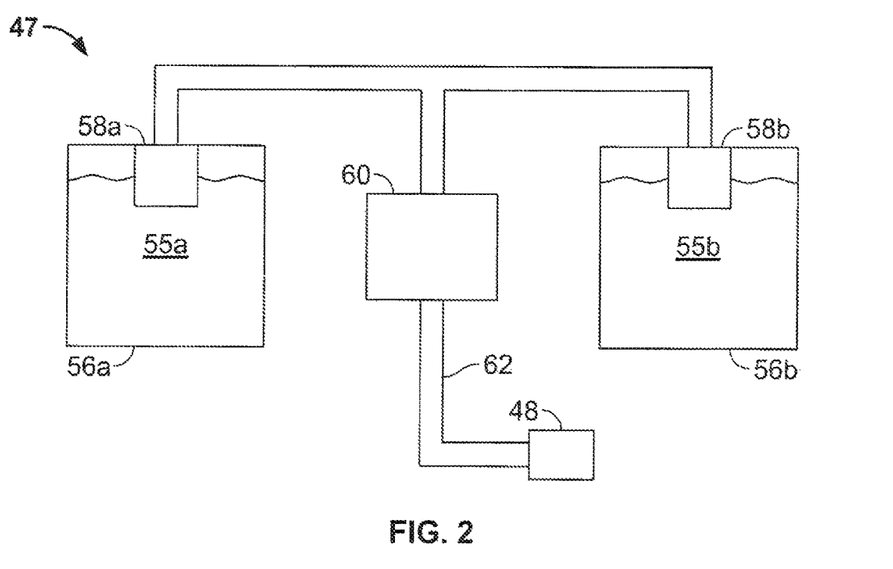
FIG. 2 is a schematic view of a first embodiment of an application device for use in creating the cable of FIG. 1.
Figure 3:
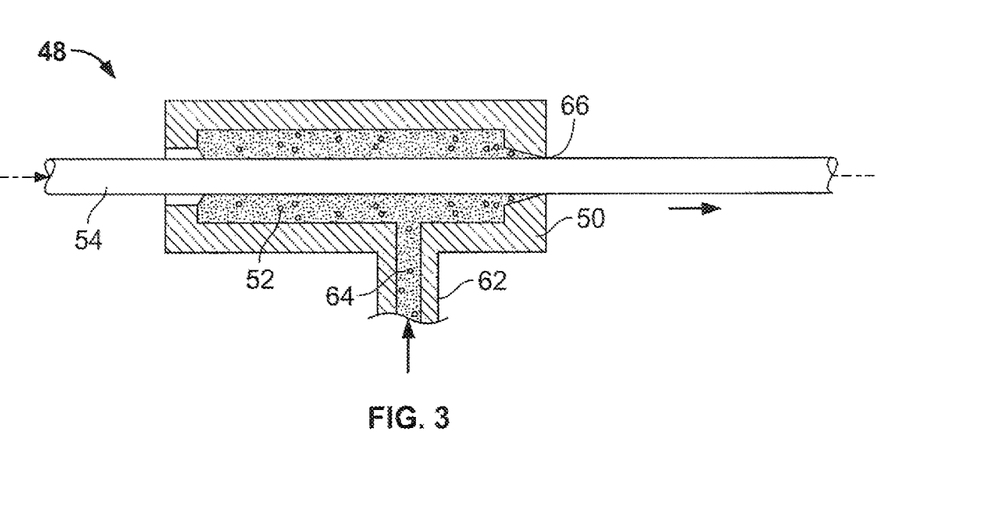
FIG. 3 is a schematic cross sectional view of the applicator of the application device of FIG. 2.

A first embodiment of the application device is indicated in general at 47 in FIG. 2. As illustrated in FIGS. 2 and 3, the application device features and applicator, illustrated at 48 in FIGS. 2 and 3. As illustrated in FIG. 3, the applicator includes an application housing 50 that encloses a pressure chamber 52, through which the twisted wires (and any filler such as 24 of FIG. 1) 54 travel during the cabling operation just prior to the taping operation.

With reference to FIG. 2, one part (55a) of a two-part silicone compound is pumped from a drum 56a using a plunger system or hydraulic pump 58a, while the other part (55b) of the two-part silicone compound is pumped from drum 56b using plunger system or hydraulic pump 58b. Other pumping devices known in the art may be used in place of plunger system or hydraulic pumps 58a and 58b. The pressurized flows of the first and second parts of the silicon compound from drums 56a and 56b are mixed in a mixing nozzle 60 and then flow to the applicator 48 via line 62. With reference to FIG. 2, the flow of the pressurized, mixed silicon compound 64 through line 62 pressurizes the chamber 52 with silicone compound as the wires (and any filler) 54 pass through the chamber. As an example only, the preferred pressure of chamber 52 is approximately 2000-5000 psi.

Figure 4:
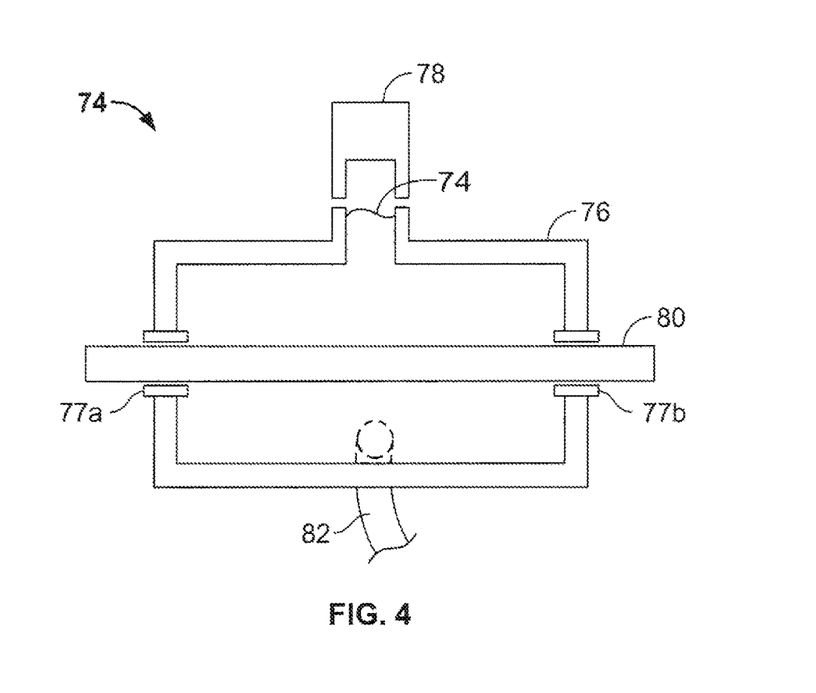
FIG. 4 is a schematic cross sectional view of a second embodiment of an application device for creating the cable of FIG. 1.

A second embodiment of the application device is indicated in general at 72 in FIG. 4. In this embodiment, a silicone compound (such as a mixed two-part silicone compound) 74 is stored within a chamber 76. A pressurizing device 78 causes the chamber 76 to be pressurized. The twisted wires (and filler) 80 travel through orifices or dies 77a and 77b (which serves as a sizing die) of the chamber 76 so that the silicone compound is applied thereto. A supply line 82 leading from a supply of the silicone compound replenishes the silicone compound 74. Examples of suitable pressurizing devices 78 include an air pump, a piston device (where the piston acts on the silicone compound 74) or, in simpler cable configurations, merely passing the cable through an unpressurized container filled with silicone is sufficient to give adequate deposits of silicone to the cable.

Figure 5:
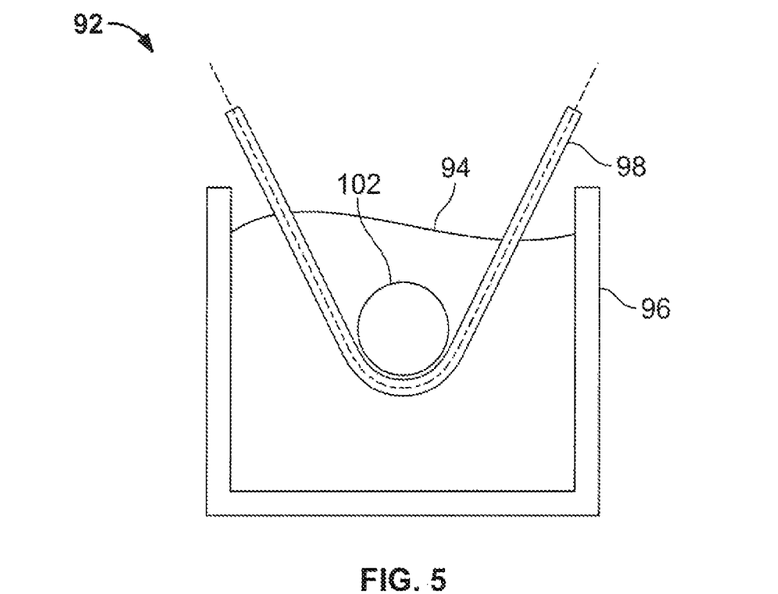
FIG. 5 is a schematic cross sectional view of a third embodiment of an application device for creating the cable of FIG. 1.

A third embodiment of the application device is indicated in general at 92 in FIG. 5. In this embodiment, a silicone compound (such as a mixed two-part silicone compound) 94 is stored in a container 96 and the twisted wire (and any filler) 98 is "passed through" this container using groove or pulley device 102 as shown so that the silicone compound is applied thereto.

Figure 6:
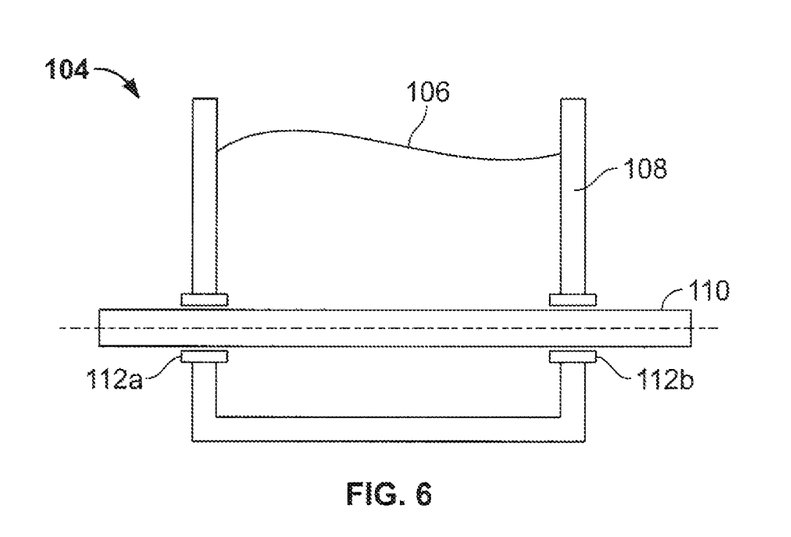
FIG. 6 is a schematic cross sectional view of a fourth embodiment of an application device for creating the cable of FIG. 1.

A fourth embodiment of the application device is indicated in general at 104 in FIG. 6. In this embodiment, a silicone compound (such as a mixed two-part silicone compound) 106 is stored in a container 108 and the twisted wire (and any filler) 110 is "passed through" orifices or dies 112a and 112b (which serves as a sizing die) in the container so that the silicone compound is applied thereto.

As noted previously, the application device fills the cable with the silicone compound at the cabling stage prior to the taping stage. In the case of the embodiments of FIGS. 3, 4 and 6 sizing die 66 (FIG. 3), 77b (FIG. 4) or 112b (FIG. 6) on the chamber outlets smoothes the surface of the cable as it exits the application devices. The tape then goes over the silicone compound, wires and filler using processes known in the prior art (such as, as an example only, U.S. Pat. No. 4,767,182 to Parfree et al., the contents of which are hereby incorporated by reference) and further encapsulates the silicone compound, wires and filler. While the silicone compound is still in a "mushy" stage, the tape provides containment. The process must be robust enough to fill all the space between the conductors.

The next process is extrusion of the FEP (Fluorinated Ethylene Propylene) jacket over the Aluminum/Mylar tape. Since the Mylar side of the tape and plastic on the jacket doesn't fuse, the space between the tape and the jacket is another potential leak path. A layer of the silicone compound (such as those described above), indicated at 114 in FIG. 1, is applied over the Aluminum/Mylar tape, using a second application device. This application device may be of the type shown in any of FIGS. 2-6, or any other application device known in the art, to close this leak path. Preferably, a surplus amount of silicone compound is applied in one application so that there is a remnant layer of silicone on the Aluminum/Mylar tape.

The entire cable is then post cured (with or without the application of temperature) to set the silicone compound. The curing can be achieved, for example, a) in 24 hours either by room temperature vulcanization of the compound, or b) in 3-4 hours by placing the cables in an air circulating oven for 4-6 hours at 150° F.

Braids (such as 44 and 46 of FIG. 1) may then be applied to the cable using processes well known in the art.

As noted previously, the supplier of the wire preferably applies the correct amount of silicone compound or other filling material between the conductor strands, sufficient to seal the leakage path between the conductor strands. Alternatively, an application device of the type shown in FIGS. 2-6, or any other application device known in the art, may be used to close the leak paths between the conductors of the wire.

Figure 7:
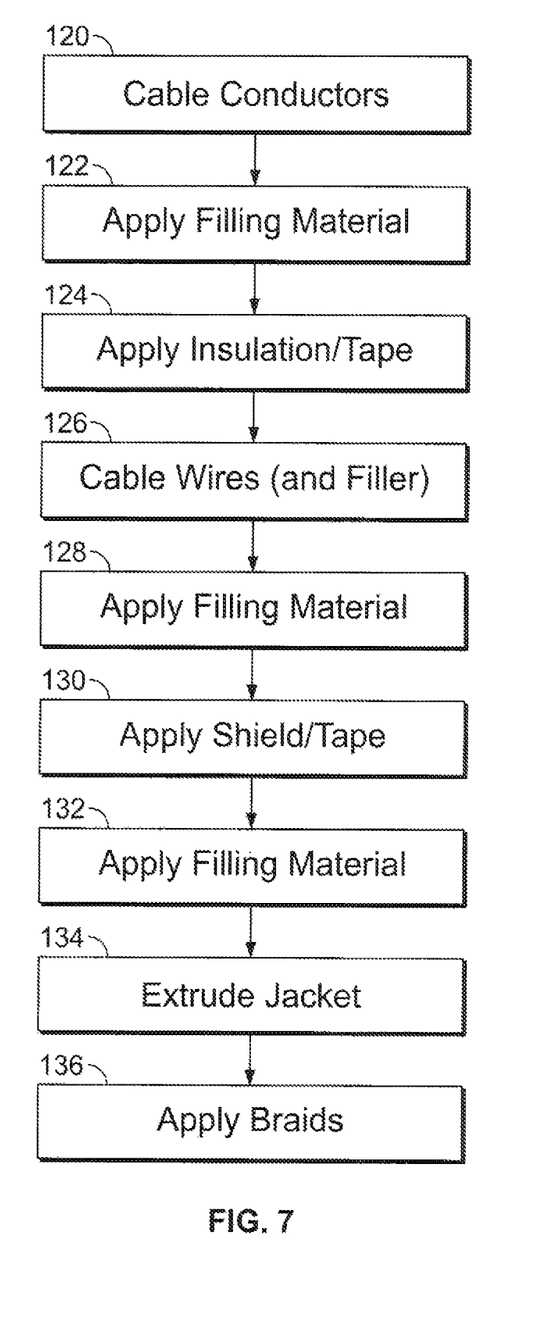
FIG. 7 is a flow chart illustrating an embodiment of the gas blocking cable making process of the present invention.

An illustration of a process for making a gas blocking cable in an embodiment of the invention is illustrated in FIG. 7 where 120 illustrates cabling insulated conductors (such as 12 in FIG. 1). After the insulated conductors are cabled, or while they are being cabled, filling material, such as silicone compound, is applied to the interstitial space (15 in FIG. 1) using one or more of the application devices of FIGS. 2-6 as indicated at 122. As indicated at 124, an insulation material (18 in FIG. 1) such as a polyimide tape with an overcoat of liquid polyimide is then applied to form a wire (20a and 20b of FIG. 1). As indicated at 126, the wire (20a, 20b and 22 of FIG. 1) and any filler (24 of FIG. 1) are cabled next. Filling material, such as silicone compound is then applied at 128 to the spaces (38) between the twisted wires and filler using one or more of the application devices of FIGS. 2-6. A shield (36 in FIG. 1) such as Aluminum Mylar tape, is then applied at 130. As indicated at 132, the shield is coated with a layer of filling material such as silicone compound. Next, at 134, extrusion of the FEP (Fluorinated Ethylene Propylene) jacket (42 in FIG. 1) over the shield occurs. Finally, as shown at 136, braids (44 and 46 in FIG. 1) are applied to the cable.

The multi-conductor cable described above is capable of blocking passage of gas/fluid through the interstitial spaces in the multi-conductor cable to prevent passage of high pressure gases in turbine and power generation applications.

The cable described and constructed in the manner above is able to pass a fluid (oil) leakage test at a high pressure of 435 psi (about 3000 kPa) and may withstand temperatures up to approximately 200° C. and still maintains flexibility.

Recent changes to UL 1277 Impact Test requirements require that the two outer braids of a gas blocking cable be removed during impact testing. To meet the new requirements, the cable disclosed in FIG. 8 and described below, following steps have been taken to lessen impact to the plurality of insulated conductors within the cable.

Figure 8:
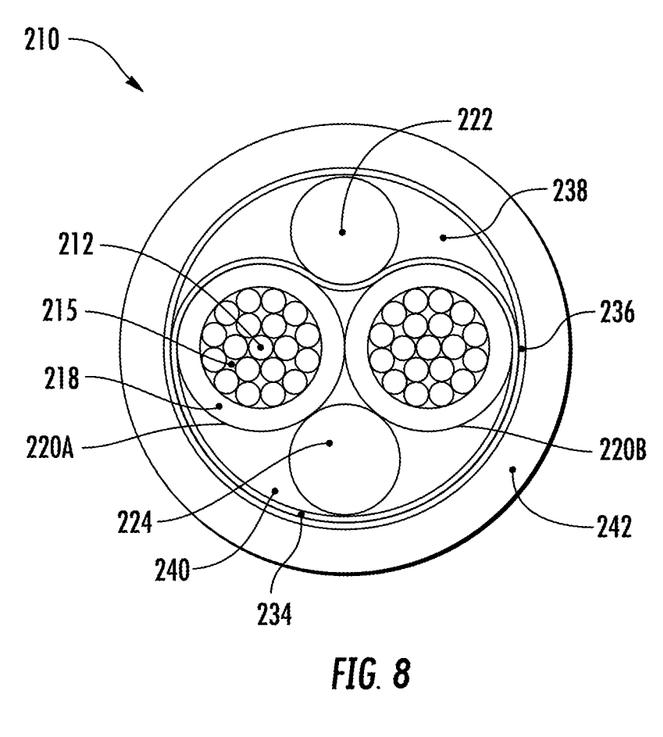
FIG. 8 is a cross sectional view of a second embodiment of a gas blocking cable in accordance with aspects of the invention.

An embodiment of the gas blocking cable that meets UL 1227 requirements of the present invention is indicated in general at 210 in FIG. 8. The illustrated embodiment includes a number of insulated conductors 212. As an example only, the conductors may be 14 AWG, 19 strand, silver plated copper wire. The insulated conductors may include strand interstitial spaces or areas 215 that may be filled with a silicone compound. An insulation material 218 may circumferentially surround the conductors 212. The insulation 218 may be, as an example only, helically wrapped polyimide tape with an overcoat of liquid polyimide that is heat cured. The conductors 212 and insulation material 218 create separate wires 220A and 220B.

The wires 220A, 220B, which are made up of the insulated conductors 212, may be twisted with a drain wire 222 and an optional filler 224 to provide the cable with a round profile. The drain wire 222 is, as an example only, a 16 AWG tin plated copper wire. The optional filler 224 may be a high-temperature filler and may be preferably fiberglass or extruded silicone or FEP monofilament.

The drain wire 222 may be separated from the twisted wires 220A, 220B and the high-temperature filler 224 by a first shield 234. The first shield 234 circumferentially surrounds the twisted wires 220A, 220B and the high-temperature filler 224. The first shield 234 may be a helically wrapped polyester tape with a high (66% or greater) overlap. The first shield interstitial spaces or areas 240 between the twisted wires 220A, 220B, the high-temperature filler 224 and the first shield 234 may be filled with a silicone compound.

The twisted wires 220A, 220B, the drain wire 222, and the high-temperature filler member 224 may then be wrapped with a second shield 236 so that they are circumferentially surrounded. The second shield 236 may be, as an example only, Aluminum/polyester tape or Aluminum/Mylar tape. The second shield interstitial spaces or areas 238 between the first shield 234 and the second shield 236 may be filled with a silicone compound.

A jacket 242 may be extruded over the shield 236 and may be, as an example only, extruded FEP (Fluorinated Ethylene Propylene). As an example only, the nominal diameter of the jacket layer 242 may be 0.212 inches.

The gas blocking cable 210 may also contain a high-temperature fiberglass braid that preferably covers the jacket 242 while a stainless steel braid may preferably covers the fiberglass braid. In some cable configurations, an additional extruded FEP jacket may be applied over the stainless steel braid.

It is to be understood that the embodiment of the gas blocking cable 210 of FIG. 8 is an example only, and that the cable of the invention could be constructed with many alternative materials and number of any of the conductors, wires, drain wires and/or fillers in many alternative configurations.

A variety of filling material compounds may be used to fill the interstitial and other spaces or areas 215, 238, 240 in the gas blocking cable 210 in the manner described above. The filling material must be inert, non-flammable and able to withstand, and suitable for operation, temperatures up to at least approximately 200° C. A two-part, room temperature curable silicone compound preferably is used. While such a silicone compound is preferably used, other suitable compounds in the art may alternatively be used. Examples of suitable silicone compounds include, but are not limited to, the following:

a. One-part heat cure silicone, TSE-322 made by Momentive.

b. CST-2127, two-part silicone. This is a room-temperature cure two-part silicone compound available from Cri-Sil Silicone Technologies LLC of Biddeford, Me.

c. CST-2327, two-part silicone. This is a modified version of CST 2127 and is the preferred silicone compound for use, for example, in the embodiment of FIG. 8, and is also available from Cri-Sil Silicone Technologies LLC of Biddeford, Me.

The applicant devices illustrated in FIGS. 2-6 may be utilized with the gas blocking cable 210 to get the compound into the space between the different insulated conductors and wires as it has to be applied during the cabling process or in a separate process right before the Aluminum/Mylar tapes are placed on the cable. The filling material may be applied before or after conductors 212 and/or wires 220A, 220B are twisted. Multiple application devices may be used in series as required to produce the gas blocking cable 210 based on the configuration and intended use of the cable 210.

An illustration of a process for making the gas blocking cable 210 illustrated in FIG. 8 in an embodiment of the invention is illustrated in FIG. 7 where step 120 illustrates cabling insulated conductors (such as 212 in FIG. 8). After the insulated conductors 212 are cabled, or while they are being cabled, filling material, such as silicone compound, is applied to the interstitial space (215 in FIG. 8) using one or more of the application devices of FIGS. 2-6 as indicated at 122. As indicated at 124, an insulation material (218 in FIG. 8) such as a polyimide tape with an overcoat of liquid polyimide is then applied to form a wire (220a and 220b in FIG. 8). As indicated at 126, the wire (220a, 220b and drain wire 222 in FIG. 8) and any filler (224 in FIG. 8) are cabled next. The drain wire 222 may separated from the twisted wires 220A, 220B and the high-temperature filler 224 by a helically wrapped polyester tape with a high (66% or greater) overlap (first shield 234 in FIG. 8). Filling material, such as silicone compound is then applied at 128 to the spaces (238 and 240 in FIG. 8) between the twisted wires and filler using one or more of the application devices of FIGS. 2-6. A second shield (236 in FIG. 8) such as Aluminum Mylar tape, is then applied at 130. As indicated at 132, the shield is coated with a layer of filling material such as silicone compound. Next, at 134, extrusion of the FEP (Fluorinated Ethylene Propylene) jacket over the shield may occur. Finally, as shown at 136, braids may be applied to the cable.

The multi-conductor gas blocking cable 210 described above is capable of blocking passage of gas/fluid through the interstitial spaces in the multi-conductor cable to prevent passage of high pressure gases in turbine and power generation applications.

The gas blocking cable 210 described and constructed in the manner above is able to pass a fluid (oil) leakage test at a high pressure of 435 psi (about 3000 kPa) and may withstand temperatures up to approximately 200° C. and still maintains flexibility.

While the preferred embodiments of the invention have been shown and described, it will be apparent to those skilled in the art that changes and modifications may be made therein without departing from the spirit of the invention, the scope of which is defined by the appended claims.

We claim:

1. A gas blocking cable comprising;
    a plurality of wires, each wire including:
        a plurality of conductors having a first space there between;
        an insulation material circumferentially surrounding the plurality of conductors; and
        a conductor filling material positioned within the first space between the plurality of conductors;
    a drain wire twisted with the plurality of wires, wherein a first shield separates the drain wire from the plurality of wires forming a second space between the first shield and the plurality of wires;
    a second shield circumferentially surrounding the plurality of wires and the drain wire so that a cable is formed with a third space between the first shield and the second shield;
    a wire filling material positioned within the second space and the third space between the first shield and the second shield; and
    a jacket extruded and circumferentially surrounding the second shield,
    wherein each of the conductor filling material and the wire filling material is inert, non-flammable and able to withstand a temperature of at least approximately 200° C., and further wherein the gas blocking cable blocks a passage of a high pressure gas or a high pressure fluid through the first space, the second space, and the third space to prevent the passage of the high pressure gas or the high pressure fluid.

2. The gas blocking cable of claim 1, further including a high-temperature fiberglass braid circumferentially surrounding the jacket.

3. The gas blocking cable of claim 1, wherein the first shield is a helically wrapped polyester tape.

4. The gas blocking cable of claim 1, wherein the second shield is an aluminum and polyester tape.

5. The gas blocking cable of claim 1, wherein the plurality of wires are twisted.

6. The gas blocking cable of claim 5, further comprising a high-temperature filler member that is twisted along with the plurality of wires.

7. The gas blocking cable of claim 6, wherein the first shield circumferentially surrounds the plurality of wires and the high-temperature filler member.

8. The gas blocking cable of claim 1, wherein the wire filling material is a silicone compound.

9. The gas blocking cable of claim 1, wherein the conductor filling material is a silicone compound.

10. The gas blocking cable of claim 1, wherein the high pressure gas or the high pressure fluid is up to 435 psi (or about 3,000 kPa).

11. The gas blocking cable of claim 1, wherein the gas blocking cable passes a fluid leakage test at a high pressure of 435 psi (or about 3,000 kPa) and can withstand temperatures up to approximately 200° C.

12. A gas blocking cable comprising;
    a plurality of wires that are twisted, each wire including:
        a plurality of conductors having a first space there between;
        an insulation material circumferentially surrounding the plurality of conductors; and
        a conductor filling material positioned within the first space between the plurality of conductors;
    a high-temperature fiberglass filler member that is twisted along with the plurality of wires;
    a drain wire twisted with the plurality of wires, wherein a first shield circumferentially surrounds the plurality of wires and the high-temperature filler member and separates the drain wire from the plurality of wires and the high-temperature filler member, thereby forming a second space between the first shield and the plurality of wires;
    a second shield circumferentially surrounding the plurality of wires, the high-temperature filler member, and the drain wire so that a cable is formed with a third space between the first shield and the second shield;
    a wire filling material positioned within the second space between the first shield, the plurality of wires, and the high-temperature filler member, and further wherein the wire filling material is positioned within the third space between the first shield and the second shield; and
    a jacket extruded and circumferentially surrounding the second shield,
    wherein each of the conductor filling material and the wire filling material is inert, non-flammable and able to withstand a temperature of at least approximately 200° C., and further wherein the gas blocking cable blocks a passage of a high pressure gas or a high pressure fluid through the first space, the second space, and the third space to prevent the passage of the high pressure gas or the high pressure fluid.

13. The gas blocking cable of claim 12, further including a high-temperature fiberglass braid circumferentially surrounding the jacket.

14. The gas blocking cable of claim 12, wherein the first shield is a helically wrapped polyester tape.

15. The gas blocking cable of claim 12, wherein the second shield is an aluminum and polyester tape.

16. The gas blocking cable of claim 12, wherein the wire filling material and the conductor filling material are different materials.

17. The gas blocking cable of claim 12, wherein the wire filling material is a silicone compound.

18. The gas blocking cable of claim 12, wherein the conductor filling material is a silicone compound.

19. The gas blocking cable of claim 12, wherein the high pressure gas or the high pressure fluid is up to 435 psi (or about 3,000 kPa).

20. The gas blocking cable of claim 12, wherein the gas blocking cable passes a fluid leakage test at a high pressure of 435 psi (or about 3,000 kPa) and can withstand temperatures up to approximately 200° C.

\* \* \* \* \*